(No Model.)
E. CHAVANNES.
WIRE FENCE.
No. 263,482.    Patented Aug. 29, 1882.
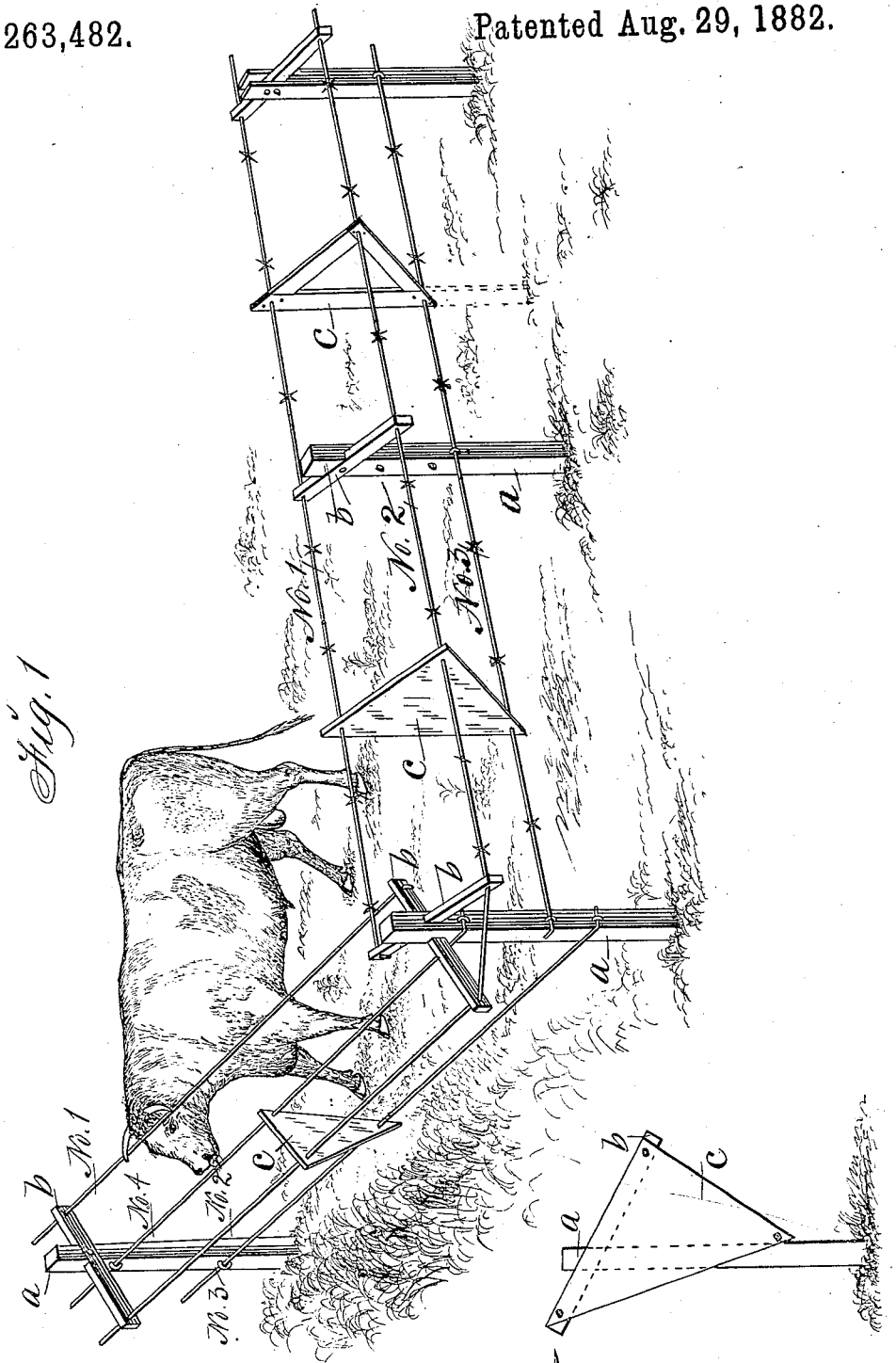
Witnesses:
John Collis
H. A. Guthrie
Inventor:
Emile Chavannes,
By Thomas C. Orwig, atty.

UNITED STATES PATENT OFFICE.

EMILE CHAVANNES, OF ALTOONA, IOWA.

WIRE FENCE.

SPECIFICATION forming part of Letters Patent No. 263,482, dated August 29, 1882.

Application filed February 23, 1882. (No model.)

*To all whom it may concern:*

Be it known that I, EMILE CHAVANNES, of Altoona, in the county of Polk and State of Iowa, have invented an Improved Wire Fence, of which the following is a specification.

The object of my invention is to restrain animals more effectually by means of wire fences without increasing the number and sizes of the wires in a fence-panel, and also to dispense with barbs on wires to avoid the dangers, accidents, and damages to persons and animals incident to the use of barbed-wire fences.

It consists in arranging three or more continuous fence-wires with fixed posts, having cross-bars attached, and triangular-shaped stay-pieces or frames, as hereinafter fully set forth, in such a manner that the wires will be in angling position relatively to each other and the posts, so as to come in contact with and strike an animal at several places at the same instant, to cause surprise and alarm and intimidation when an effort is made by the animal to get through the fence or make a breach in a panel.

Figure 1 of my accompanying drawings is a perspective view of my fence, in which are several panels of modified form. Fig. 2 is a transverse section of a panel. Together these figures clearly illustrate the construction, operation, and utility of my complete invention.

$a\ a\ a$ represent posts set in the ground.

$b\ b\ b$ are cross-pieces about two (2) feet long, fixed to the posts $a$ in inclined positions. These posts and cross-pieces may be made of wood or iron, of any size desired, and the cross-pieces may be fixed to the post by means of nails, bolts, or in any suitable way.

Nos. 1 and 2 are fence-wires fixed to the ends of the inclined cross-pieces $b$, by means of staples or in any suitable way, so that they will extend along an entire panel and fence in parallel positions at different points of elevation and at opposite sides of the posts, as clearly shown in my drawings. No. 3 is a corresponding wire fixed to the lower portions of the posts to extend parallel with the wires Nos. 1 and 2.

$c\ c\ c$ represent triangular-shaped stays, fixed to the wires Nos. 1 2 3 at central positions between the posts $a$ by passing the fence-wires through perforations in their corners, or in any suitable way. These stays may be made of wood or metal, solid or skeleton form, and vary in number between the posts. An extension or foot may be attached at their lower ends to rest upon the ground to aid in supporting the wires in a horizontal position without sagging, and to relieve them from supporting the weight of the stays, as indicated by dotted lines in Fig. 1.

No. 4 is a fourth wire in a panel, fixed to the posts $a$ and connected with a triangular-shaped stay, $c$, in place of the No. 1 and upper that is fixed to the cross-pieces $b$.

It is obvious from this arrangement of four wires relatively to each other and the post and a triangular-shaped stay (or device adapted to retain the wires at the points of a triangle) that various numbers of wires exceeding three may be used, and the stays $c$ placed in various positions to connect wires that are fixed in triangular and parallel positions relatively to each other and the line of posts in a fence.

Barbed wires may be used, as shown in Fig. 1, when preferred to plain wire.

From the foregoing detailed description of the construction of my fence and the specified function of the elements combined therein the unitary actions or results of said combined elements are apparent and the novelty and utility of my complete fence thereby clearly set forth, so that a further statement concerning the practical operation of my invention is deemed unnecessary.

I claim as my invention—

1. In a wire-fence, the combination of three wires with two or more fixed posts, having inclined cross-pieces to support two of the wires at different points of elevation at opposite sides of and distant from the posts, substantially as set forth, for the purposes specified.

2. The combination of three or more fence-wires with two or more fixed posts, having inclined cross-pieces and one or more triangular-shaped stay-pieces, substantially as shown and described, to operate in the manner set forth, for the purposes specified.

3. An improved fence consisting of fixed posts $a$, inclined cross-pieces $b$, three or more fence-wires, and stay-pieces $c$, when arranged and combined relatively to each other and the surface of the ground substantially as shown and described, for the purposes specified.

EMILE CHAVANNES.

Witnesses:
HEMAN HEMSTREET,
HERMAN MARTIN.